UNITED STATES PATENT OFFICE.

GEORGE WHITNEY, OF PHILADELPHIA, PENNSYLVANIA.

IMPROVEMENT IN THE MANUFACTURE OF CAST CHILLED WHEELS.

Specification forming part of Letters Patent No. 129,382, dated July 16, 1872; reissue No. 5,140, dated November 5, 1872.

*To all whom it may concern:*

Be it known that I, GEORGE WHITNEY, of the city and county of Philadelphia, in the State of Pennsylvania, have invented a certain new and useful Improvement in the Art of Manufacturing Cast Chilled Wheels for railroad uses and for other uses of similar character. The following is a specification of my said invention:

Heretofore the best cast chilled wheels for railroads have been made of charcoal pig-iron, or, more recently, of pig-iron and steel melted together; but I have discovered, and my invention is based upon the discovery, (which I have verified by a series of experiments,) that wrought-iron charged in with pig-iron, or with pig-iron and steel, in any required proportion —say not exceeding fifty per cent. of the whole charge—can be melted in an ordinary cupola or air furnace without any flux, but in the same simple and well-known way as if the charge consisted of pig-iron alone; and, moreover, that the melted metal produced from this mixture possesses chilling property. Upon these facts, thus ascertained, I have proceeded with my experiments, the result of which is the invention that forms the subject of this patent, and which consists in casting in the ordinary manner, and in molds such as are ordinarily used for the purpose, chilled wheels for railroads and other similar uses from a charge of wrought-iron and pig-iron, or of wrought-iron, pig-iron, and steel, (the pig-iron constituting more than fifty per cent. of the charge,) melted together in an ordinary cupola or air furnace, whereby I am enabled to produce cast chilled wheels superior both in chill and in strength to wheels made of pig-iron alone, or of pig-iron and steel melted together, with the advantages of economical apparatus, moderate requirements of skill in the art, and an enlarged range of the kinds of pig-iron thus rendered available in this manufacture. I am unable to designate by any specific name the product of the mixture above described.

As I have found that the product obtained from a charge of equal parts of pig-iron and wrought-iron is a hard and brittle white metal totally unfit for good strong cast chilled wheels, (aside from the fact that such product is obtained only with a very large percentage of loss on such a charge,) and that this metal has, moreover, when cast on a chill, an absolute and uncontrollable tendency to chill throughout, or, at least, to such an extent as would be highly detrimental to the strength and toughness so essential in the hub and plate of a cast car-wheel, I do not propose to use as much wrought-iron as pig-iron, nor as much wrought-iron and steel together as pig-iron; and I do not claim herein the manufacture of cast chilled wheels, except when made from the product of wrought-iron and pig-iron, or of wrought-iron and steel and pig-iron melted together, the pig-iron preponderating positively in the charge.

I have, in practice, varied the relative proportions of the metals specified, and have attained what I deem the best results from charges respectively made up as follows: Charcoal pig-iron, forty per cent.; anthracite pig-iron, forty per cent.; wrought-iron, twenty per cent.; or, anthracite pig-iron, eighty per cent.; wrought-iron, twenty per cent.; or, charcoal pig-iron, forty per cent.; anthracite pig-iron, forty per cent.; Bessemer steel, ten per cent.; wrought-iron, ten per cent.; or, anthracite pig-iron, eighty per cent.; Bessemer steel, ten per cent.; wrought-iron, ten per cent.

It should be observed that I have used charcoal pig-irons with good chilling property and anthracite pig-irons having slighter tendencies to chill, and I have attained good results with the mixtures above specified; but with different pig-irons different proportions of wrought-iron, or of wrought-iron and steel, may be used conformable to the different qualities of the pig-irons as to chilling property and strength, but the pig-iron always preponderating positively in the charge so as to produce the requisite chill and strength in the wheel, as is fully understood by those skilled in the art of making cast chilled wheels.

In my practice I have used for my wrought-iron old railroad rails cut into lengths about the same as the pieces into which the pig-iron is usually broken up for charging into the ordinary cupola-furnace. The wheels should be removed from the molds as soon as practicable after being cast and slow-cooled in any of the ordinary modes now practiced with cast chilled railroad wheels. I prefer the method of slow-cooling described in the Letters Patent granted to Asa Whitney, April 25, 1848.

So long as the pig-iron constitutes positively more than fifty per cent. of the charge I do not confine myself to any exact or fixed percentage of wrought-iron, or of wrought-iron and steel, as these must necessarily be varied somewhat in view of the requirements I have stated, and which are well understood by those skilled in this art; but

What I claim as my invention, and desire to secure by Letters Patent, is—

As a new article of manufacture, a cast chilled car-wheel made from the product of wrought-iron and pig-iron, or of wrought-iron, pig-iron, and steel, melted together, the pig-iron preponderating in the charge, substantially as hereinbefore set forth.

GEO. WHITNEY.

Witnesses:
GEO. H. KIRK,
ROBT. S. REDFIELD.